(12) United States Patent
Son

(10) Patent No.: US 8,343,600 B2
(45) Date of Patent: Jan. 1, 2013

(54) CASE MODULE FOR PORTABLE TERMINAL USING THERMAL ADHESIVE TAPE

(75) Inventor: Chang-Ki Son, Ansan-si (KR)

(73) Assignee: IL Shin Tech Co., Ltd. (KR)

( * ) Notice: Subject to any disclaimer, the term of this patent is extended or adjusted under 35 U.S.C. 154(b) by 466 days.

(21) Appl. No.: 12/795,885

(22) Filed: Jun. 8, 2010

(65) Prior Publication Data

US 2011/0052844 A1     Mar. 3, 2011

(30) Foreign Application Priority Data

Aug. 31, 2009    (KR) ........................ 10-2009-0081229

(51) Int. Cl.
*B32B 1/02* (2006.01)
*B32B 23/00* (2006.01)
*B32B 1/08* (2006.01)

(52) U.S. Cl. ..................... 428/34.1; 428/34.2; 428/35.7; 428/35.9; 428/36.9

(58) Field of Classification Search ................. 428/34.1, 428/34.2, 35.7, 35.9, 36.9
See application file for complete search history.

(56) References Cited

U.S. PATENT DOCUMENTS

2005/0265574 A1* 12/2005 Holmes et al. ................ 381/388
2008/0199038 A1* 8/2008 Holmes et al. ................ 381/388

\* cited by examiner

*Primary Examiner* — Marc Patterson
(74) *Attorney, Agent, or Firm* — Cantor Colburn LLP

(57) ABSTRACT

Disclosed is a case module for a portable terminal using a thermal adhesive tape. The portable terminal using a thermal adhesive tape includes: a case and a LCD cover of a portable terminal disposed so as to face with each other; a heated sheet made of a conductor and disposed between the case and the LCD cover; a first melting sheet adhered to a face of the heated sheet facing to the case; and a second melting sheet adhered to the other face of the heated sheet facing to the LCD cover, wherein the first sheet is melted to couple the heated sheet and the case to each other and the second sheet is melted to couple the heated sheet and the LCD cover to each other when the heated sheet is heated by a high frequency induction.

5 Claims, 9 Drawing Sheets

(a)

(b)

FIG. 1
*Prior Art*
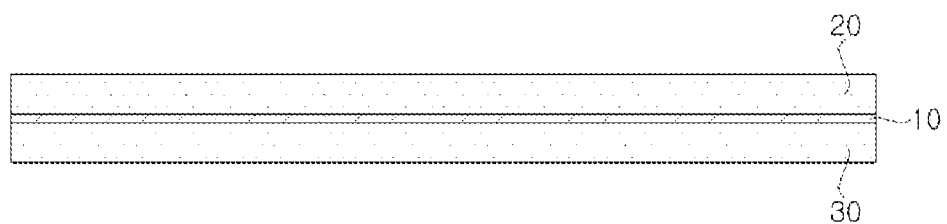
(a)
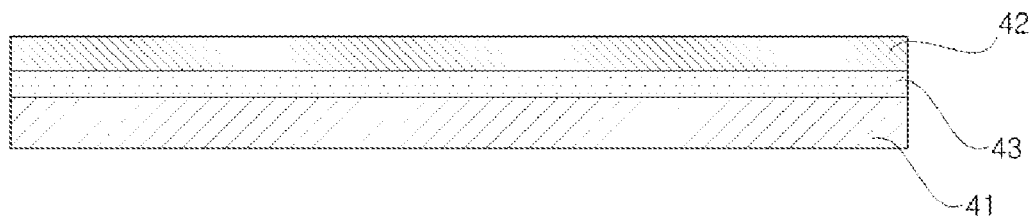
(b)

FIG. 2
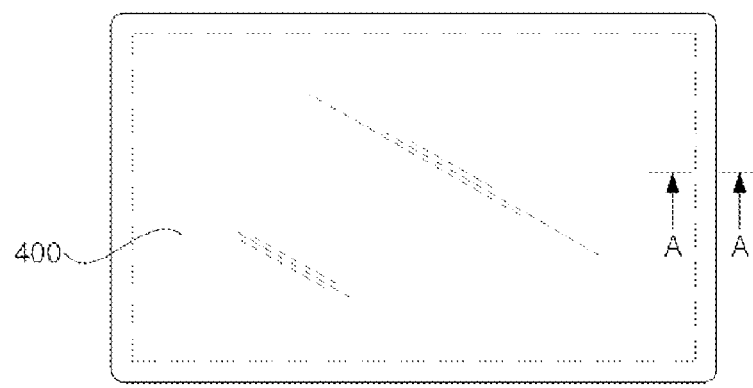
(a)
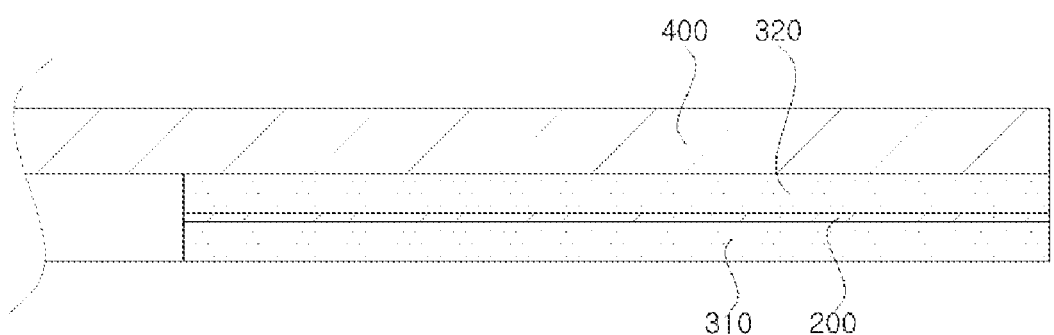
(b)

FIG. 4
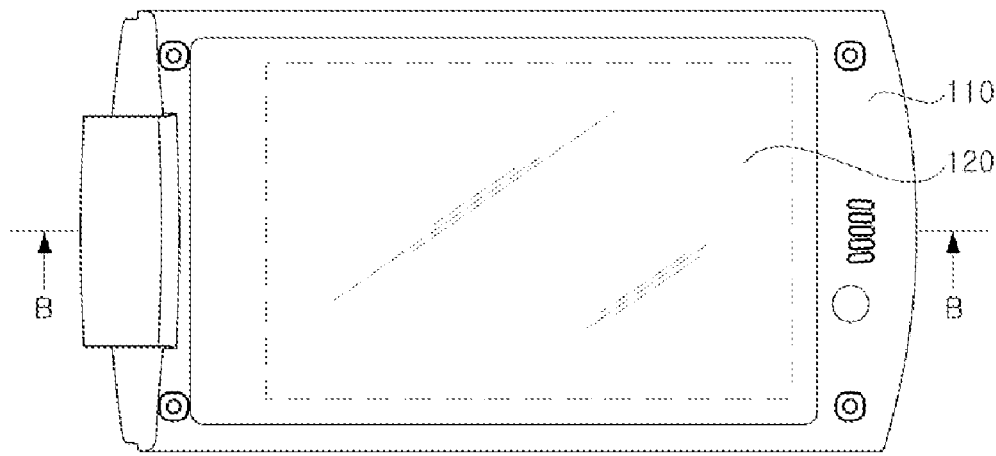
(a)
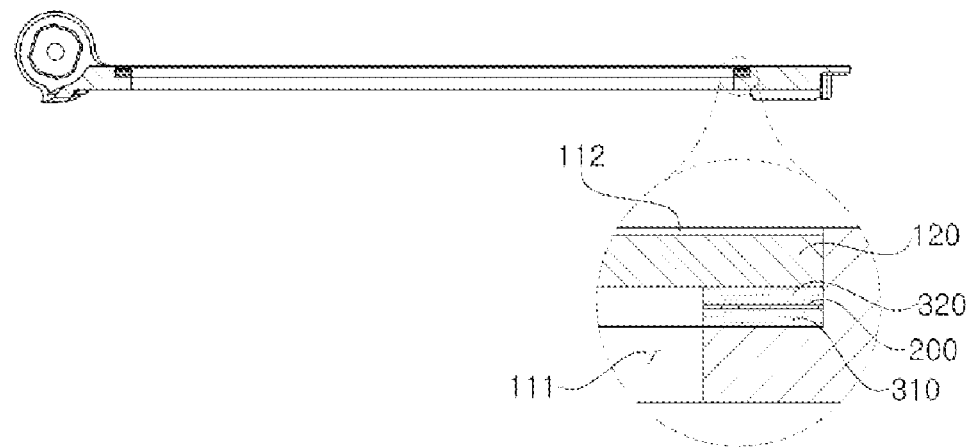
(b)

FIG. 6
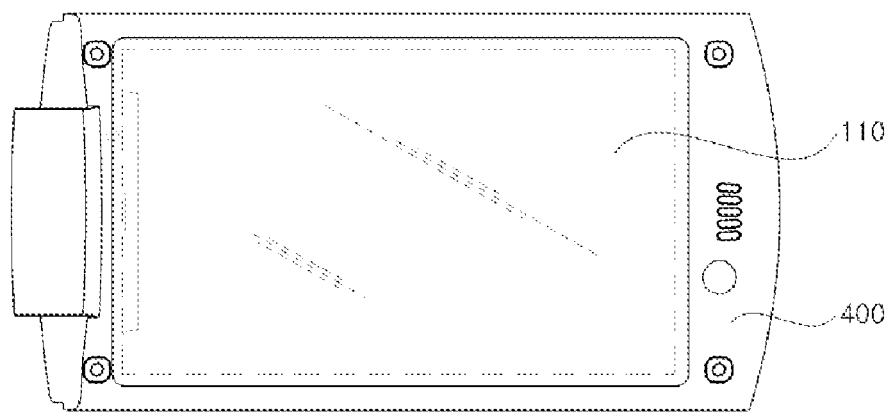
(a)
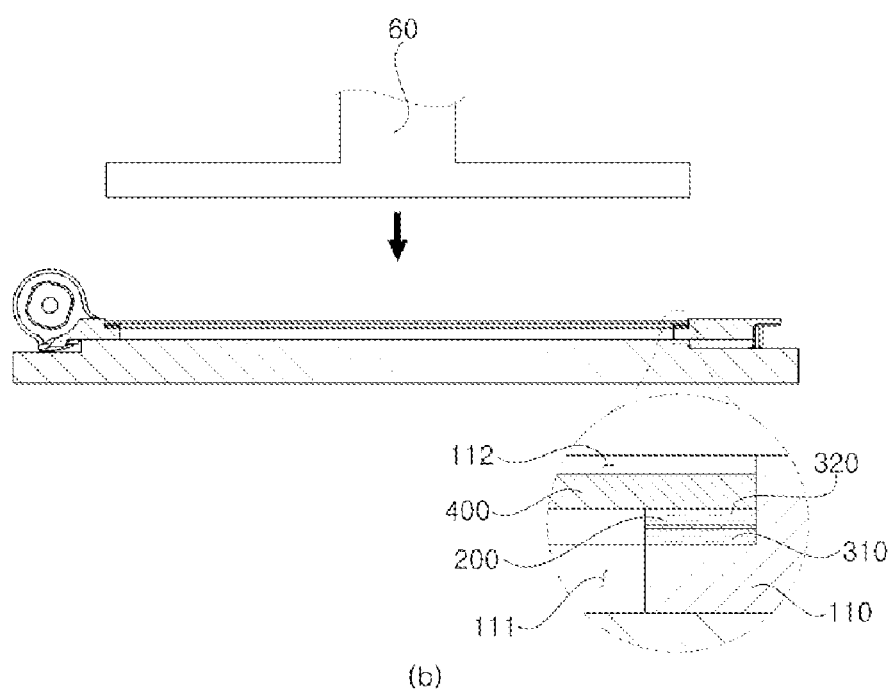
(b)

FIG. 8
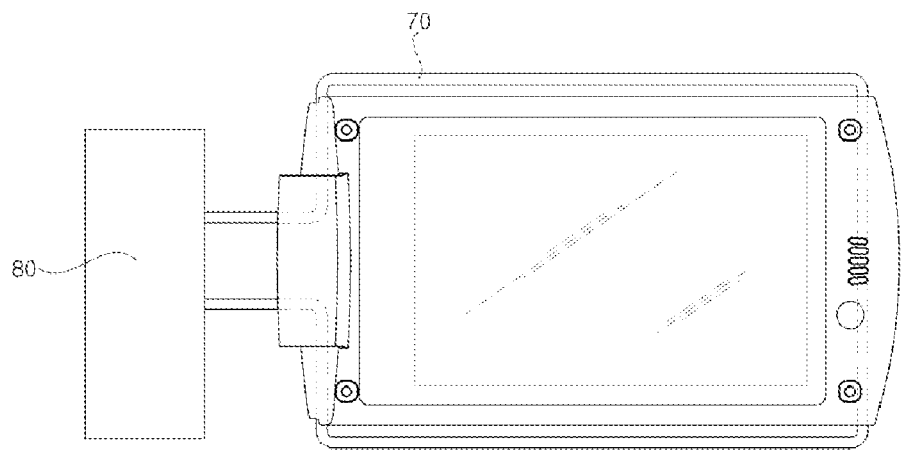
(a)
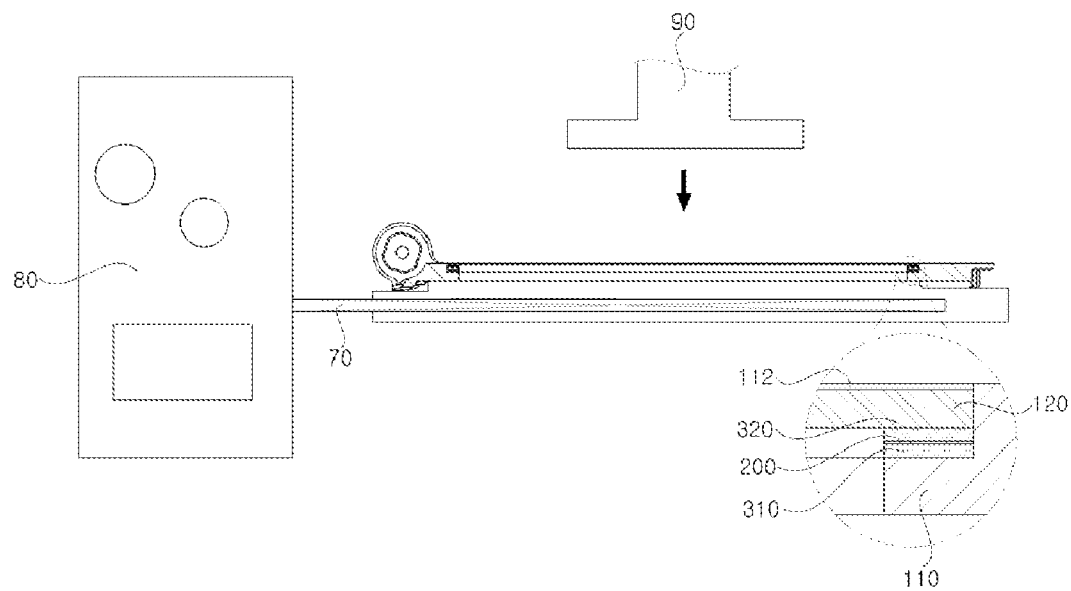
(b)

FIG. 9
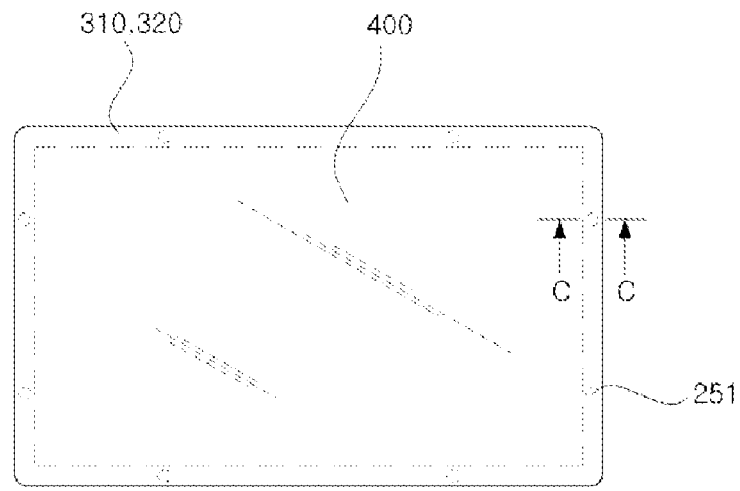
(a)
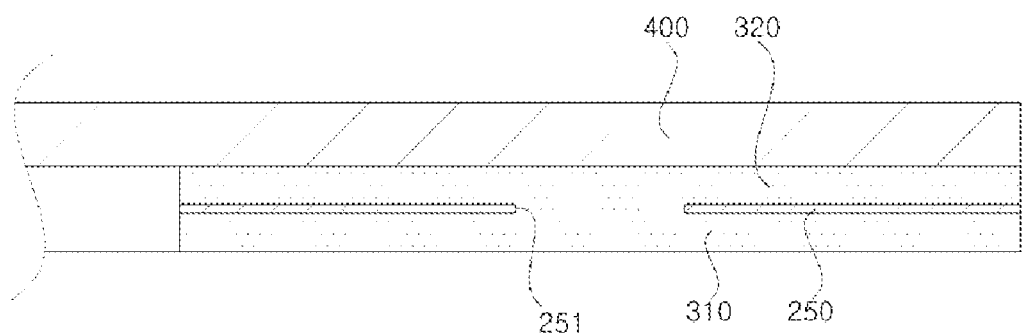
(b)

CASE MODULE FOR PORTABLE TERMINAL USING THERMAL ADHESIVE TAPE

BACKGROUND OF THE INVENTION

1. Field of the Invention

The present invention relates to a case module for a portable terminal using a thermal adhesive tape, and more particularly, to a case module for a portable terminal using a thermal adhesive tape that thermally adheres a case and a LCD cover of the portable terminal with each other.

2. Description of Related Art

FIG. 1A is a structural diagram of a conventional thermal adhesive tape.

As shown in FIG. 1A, the conventional thermal adhesive tape is provided with a non-woven fabric 10 in the middle thereof and a first adhesive sheet 20 and a second adhesive sheet 30 on both sides of the non-woven fabric 10.

Adhesion of two adherends with each other using the conventional thermal adhesive tape is carried out in such a manner that the thermal adhesive tape is first disposed between the adherends and heat is directly applied to the adherends by a thermocompressing apparatus to be then transferred to the first melting sheet 20 and the second melting sheet 30 through the adherends, and thereby the first melting sheet 20 and the second melting sheet 30 are melted and adhered to the adherends.

Therefore, to adhere the conventional thermal adhesive tape to the adherends, at least one of the two adherends should be a heat-transferable material (for example, SUS, metal, etc.).

That is, since the heat should be transferred to the thermal adhesive tape placed between the adherends, at least one of the adherends should have a high thermal conductivity.

In the case of adhering two adherends, both having low thermal conductivity, e.g. synthetic resins, another adhering method is used since the conventional thermal adhesive tape as described above has a problem that the adherends are deformed by the heat before the first melting sheet 10 or the second melting sheet 20 is melted.

For example, a conventional technique for adhering a case and a LCD cover of a portable terminal will be described.

FIG. 1B is a sectional view showing a case for a portable terminal in which a LCD cover for a portable terminal is mounted.

In general, a case 41 and a LCD cover 42 of a portable terminal and a small electronic appliance are adhered with a double sided tape 43 as shown in FIG. 1B.

In recent, with miniaturization of a portable terminal and enlargement in a size of a LCD, an area of the double sided tape 43 that comes into contact with the LCD cover 42 and the case 41 has been reduced.

However, the reduction in the adhesion area of the double sided tape 43 results in an insufficiency in adhesive strength for coupling the LCD cover 42 and the case and resultant easy separation of the LCD cover 42 from the case 41.

Also, it may be possible to carry out the adhesion using a silicon bond instead of the double sided tape 43, but there is a problem that productivity is significantly dropped since a compression and dry process in a jig for 10 hours or more is required after the bonding process.

Further, the silicon bond has a problem that its impact resistance becomes worse with time to thereby cause trouble.

SUMMARY OF THE INVENTION

Embodiments of the present invention are directed to a case module for a portable terminal using a thermal adhesive tape, which employs a thermal adhesive tape upon adhesion of a case and a LCD cover of a portable terminal to thereby improve productivity and coupling strength.

In one embodiment, a case module for a portable terminal using a thermal adhesive tape includes: a case and a LCD cover of a portable terminal disposed so as to face with each other; a heated sheet made of a conductor and disposed between the case and the LCD cover; a first melting sheet adhered to a face of the heated sheet facing to the case; and a second melting sheet adhered to the other face of the heated sheet facing to the LCD cover, wherein the first sheet is melted to couple the heated sheet and the case to each other and the second sheet is melted to couple the heated sheet and the LCD cover to each other when the heated sheet is heated by a high frequency induction.

Preferably, the case is openly formed of a screen part, and the LCD cover has a width greater than a width of the screen part. Also, the heated sheet, the first melting sheet and the second melting sheet are formed in a hollowed shape, and have an inner width greater than the width of the screen part and an outer width smaller than a width of the LCD cover.

Preferably, the case is formed of a mounting recess in which the first melting sheet, the heated sheet and the second melting sheet are inserted, and sum of thicknesses of the first melting sheet, the heated sheet and the second melting sheet is smaller than a depth of the mounting recess.

Preferably, the heated sheet is formed with a through hole that penetrates therethrough in a direction from the first melting sheet to the second melting sheet and vice versa.

Preferably, the heated sheet has a thickness smaller than those of the first and second melting sheets.

The case module for a portable terminal using a thermal adhesive tape has advantages as follows.

It is possible to adhere adherends made of synthetic resin having a low thermal conductivity such as polycarbonate, acryl and ABS as the heated sheet, which is heated by a high frequency induction, is disposed between the first melting sheet and the second melting sheet to couple the case and the LCD cover, give an adhesive strength stronger than a general bonds as the adhesion is carried out by heat, and improve productivity as the adhesion is carried out in a short time.

As the first melting sheet and the second melting sheet have an inner width greater than the width of the screen part and an outer width smaller than a width of the LCD cover, the first melting sheet, the heated sheet and the second melting sheet are disposed only in the section where the case and the LCD cover are overlapped with each other, thereby capable of reducing waste and decreasing the manufacturing cost.

As the sum of the first melting sheet, the heated sheet, the second melting sheet and the LCD cover is smaller than the depth of the mounting recess, the LCD cover is inserted so as not to be projected out of the case and is prevented from being separated from the case by external force.

As the through hole is formed in the heated sheet, the first melting sheet and the second melting sheet are coupled directly to each other and this improves the adhesive strength between the adherends coupled by the first melting sheet and the second melting sheet.

As the heated sheet has a thickness thinner than those of the first and second melting sheets, it is possible to reduce the heat transferred to the case and the LCD cover when the heated sheet is heated and to thereby prevent the case and the LCD cover from being deformed by the heat.

BRIEF DESCRIPTION OF THE DRAWINGS

FIG. 1 is a structural diagram of a conventional thermal adhesive tape.

FIG. 2 is structural diagram of a thermal adhesive tape in accordance with an embodiment of the present invention.

FIG. 4 is structural diagram of a case module for a portable terminal using the thermal adhesive tape in accordance with an embodiment of the present invention.

FIGS. 5 through 8 are views illustrating processes of assembling a case module for a portable terminal the thermal adhesive tape in accordance with an embodiment of the present invention.

FIG. 9 is structural diagram of a thermal adhesive tape in accordance with another embodiment of the present invention.

DESCRIPTION OF SPECIFIC EMBODIMENTS

Hereinafter, preferred embodiments of the present invention will be described in detail with reference to accompanying drawings.

Figure 3:
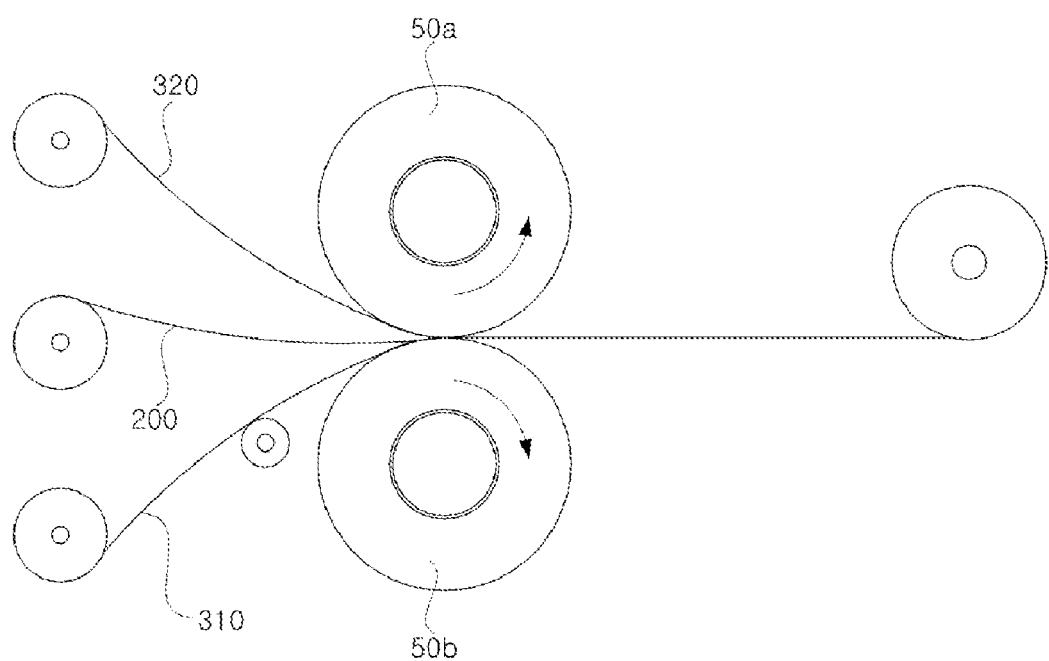
FIG. 3 is a view illustrating a manufacturing process of the thermal adhesive tape for a portable terminal in accordance with an embodiment of the present invention.

FIG. 2A is a plan view of a thermal adhesive tape in accordance with an embodiment of the present invention, FIG. 2B is a sectional view taken along a line A-A of FIG. 2A, FIG. 3 is a view illustrating a manufacturing process of the thermal adhesive tape for a portable terminal in accordance with an embodiment of the present invention, FIG. 4A is a plan view of a case module for a portable terminal using the thermal adhesive tape in accordance with an embodiment of the present invention, and FIG. 4B is a sectional view taken along a line B-B of FIG. 4A.

As illustrated in FIGS. 2 and 3, a thermal adhesive tape in accordance with an embodiment of the present invention includes a heated sheet 200, a first melting sheet 310, a second melting sheet 320 and a base film 400.

Also, as illustrated in FIG. 4, a case module for a portable terminal using the thermal adhesive tape in accordance with an embodiment of the present invention includes a case 110, a LCD cover 120, the heated sheet 200, the first melting sheet 310, and the second melting sheet 320.

The case 110 is an element that forms an appearance of a display part of a portable terminal and is disposed on a front face of a LCD module.

Also, the case 110 is openly formed of a screen part 111 so that a screen of the LCD module is seen from the outside.

The screen part 111 is formed in a rectangular shape through the case in front and rear directions and has a width smaller than a width of the LCD cover 120, which will be described later.

Further, the case 110 is formed of a mounting recess 112 in which the heated sheet 200, the first melting sheet 310 and the second melting sheet 320 are inserted.

The mounting recess 112 has a rectangular shape, is communicated with the screen part 111 and is opened in a direction toward the front, i.e. a direction toward the LCD cover 120.

Also, the mounting recess 112 has a depth greater than sum of the thicknesses of the heated sheet 200, the first melting sheet 310 and the second melting sheet 320, which will be described later.

The LCD cover 120 is formed in a shape of a thin plate and is made of a transparent material so that the screen of the LCD module mounted in an inside of the portable terminal is seen from the outside.

Also, the periphery of the LCD cover 120 has an opaque design of a border shape so that the rest components other than the LCD module are not seed from the outside and tidy appearance can be obtained.

Further, LCD cover 120 has a width greater than the width of the screen part 111 and smaller than the width of the mounting recess 112.

This LCD cover 120 is disposed so as to face the case 100 and is inserted in the mounting recess 112 so as to seal the screen part 111.

Meanwhile, the heated sheet 200 is disposed between the case 110 and the LCD cover 120.

The heated sheet 200 is formed in a shape of a hollow rectangular and is made of aluminum or copper through which current flows well.

Of course, the heated sheet 200 can be formed of other conductor other than the aluminum or copper, but it is preferred to employ the aluminum or copper which has high thermal conductivity and electric conductivity and is easily worked.

Also, the heated sheet 200 has a thickness of about 7 to 14 μm, which is, as will be described later, smaller than the thicknesses of the first melting sheet 310 and the second melting sheet 320.

The heated sheet 200 is adhered with its one face to the first melting sheet 310 and with the other face to the second melting sheet 320.

The first melting sheet 310 and the second melting sheet 320 are formed in a hollow rectangular shape like the heated sheet 200, and have a thickness of about 70 μm.

Also, the first melting sheet is thermally adhered with the case 110 and the second melting sheet 320 is thermally adhered with the LCD cover 120.

As the heated sheet 200 has the thickness thinner than those of the first melting sheet 310 and the second melting sheet 320 as described above, it is possible to reduce the heat transferred to the case 110 and the LCD cover 120 when the heated sheet 200 is heated and to thereby prevent the case 110 and the LCD cover 120 from being deformed by the heat.

Also, the first melting sheet 310 and second melting sheet 320 are made of polyester composition.

The polyester is a generic term of a polymer compound having an ester group as a linker.

Also, all of the first melting sheet 310, the heated sheet 200 and the second melting sheet 320 are formed in the same hollow rectangular shape and have an inner width greater than the width of the screen part 111 and an outer width smaller than the LCD cover 120.

That is, the first melting sheet 310, the heated sheet 200 and the second melting sheet 320 are formed so as to be disposed within a section in which the LCD cover 120 and the case 110 are overlapped with each other.

As the first melting sheet 310, the heated sheet 200 and the second melting sheet 320 have the inner width greater than the width of the screen part 111 and the outer width smaller than the LCD cover 120 as described above, the first melting sheet 310, the heated sheet 200 and the second melting sheet 320 are disposed only the section where the LCD cover 120 and the case 110 are overlapped with each other, thereby capable of reducing waste and decreasing the manufacturing cost.

Also, the sum of the first melting sheet 310, the heated sheet 200, the second melting sheet 320 and the LCD cover 120 is smaller than the depth of the mounting recess 112.

As the sum of the first melting sheet 310, the heated sheet 200, the second melting sheet 320 and the LCD cover 120 is smaller than the depth of the mounting recess 112 as described above, the LCD cover 120 is inserted so as not to projected out of the case 110 and is prevented from being separated from the case 110 by external force.

Also, the second melting sheet 320 is provided with the base film 400 on a side thereof opposite to the heated sheet 200.

The base film 400 is formed in a thin rectangular shape and is made of a transparent material.

As the base film 400 is made of a transparent material, the location is easily seen when the first melting sheet 310 as described above, the heated sheet 200 and the second melting sheet 320 are mounted on the case and this facilitates assembly.

Also, the base film 400 is mounted removably on the second melting sheet 320.

Specifically, the base film 400 is provided with a removable adhesive layer on the face thereof at the side of the second melting sheet 320.

The removable adhesive is suitable to temporarily adhere the base film 400 to the second melting sheet 320 since it has excellent re-adhesive property and re-detachability.

As the base film 400 is mounted removably on the second melting sheet 320 as described above, the base film 400 can be easily removed upon the assembly and this improves the productivity.

Hereinafter, a process for manufacturing the thermal adhesive tape in accordance with an embodiment of the present invention having the structure as described above will be described.

As illustrated in FIG. 3, the first melting sheet 310 and the second melting sheet 320 are adhered to the heated sheet 200 by heat.

Specifically, the first melting sheet 310, the heated sheet 200 and the second melting sheet 320 are sequentially stacked between two heating rollers 50a and 50b.

At this time, the first melting sheet 310, the heated sheet 200 and the second melting sheet 320 are wound on a bobbin in a state of a raw material, respectively.

The heating rollers 50a and 50b having a cylindrical shape are heated to about 100° C. and rotate at a speed of 5 m/min.

As these heating rollers 50a and 50b rotate in opposite directions, the first melting sheet 310, the heated sheet 200 and the second melting sheet 320 are compressed and heated from the upper and lower sides.

At this time, the first melting sheet 310 and the second melting sheet 320 are slightly melted by the heat of the heating rollers 50a and 50b and adhered to the heated sheet 200.

After that, the first melting sheet 310, the heated sheet 200 and the second melting sheet 320 adhered to each other are wound again on another bobbin disposed in the transport direction.

As the first melting sheet 310, the heated sheet 200 and the second melting sheet 320 are disposed between the heating rollers 50a and 50b and adhered to each other by compression and heating as described above, the work is carried out continuously and quickly and this improves the productivity.

After that, the base film 400 is stacked on the second melting sheet 320 and adhered to the second melting sheet 320 using a roller.

Finally, the first melting sheet 310, the heated sheet 200 and the second melting sheet 320 except for the base film 400 are cut into a hollow rectangular shape to remove the unnecessary portions therein.

Hereinafter, a method of adhering a case and a LCD cover for a portable terminal using the thermal adhesive tape in accordance with an embodiment of the present invention having the structure as described above will be described.

FIGS. 5 through 8 are views illustrating processes of assembling a case module for a portable terminal the thermal adhesive tape in accordance with an embodiment of the present invention.

Figure 5:
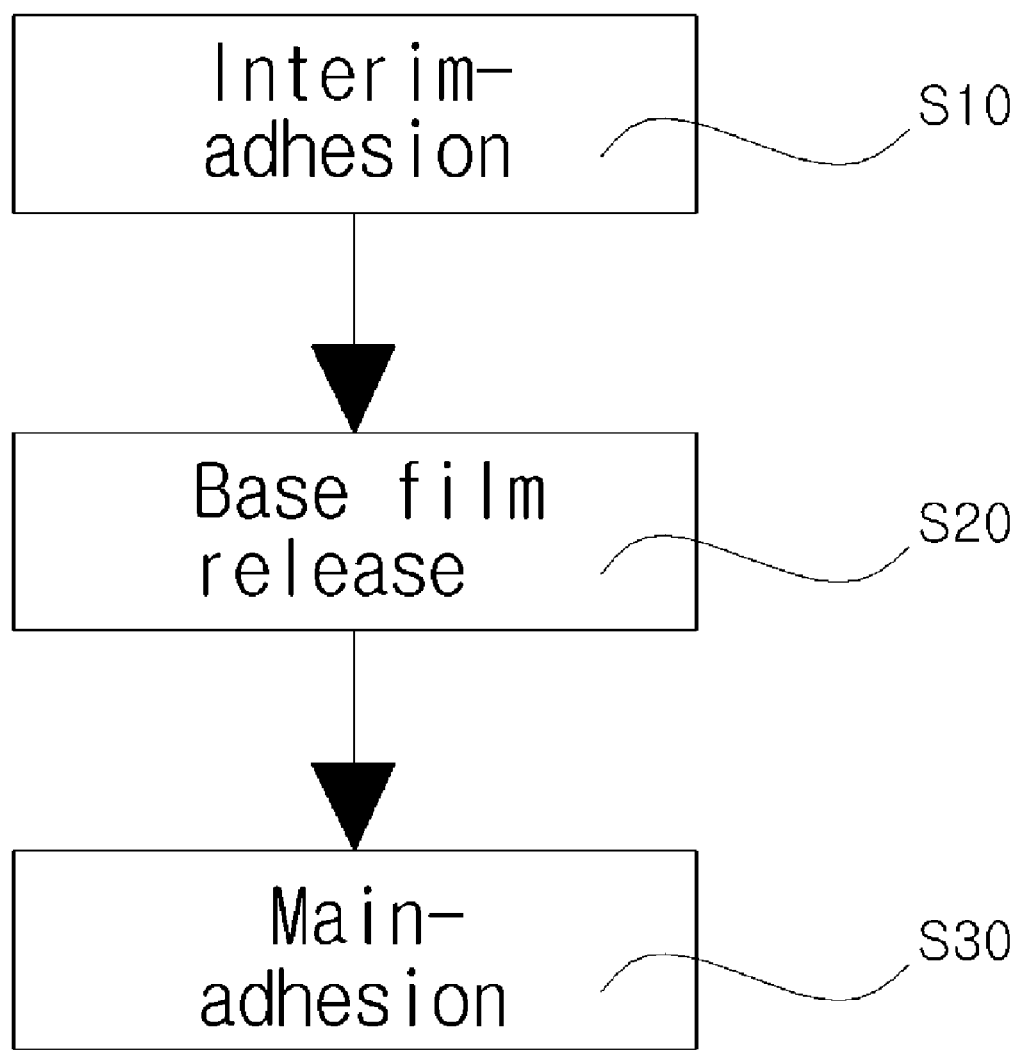

As illustrated in FIG. 5, the adhering method using the thermal adhesive tape in accordance with an embodiment of the present invention is carried out in a sequence of interim-adhesion step (S10), base film release step (S20) and main-adhesion step (S30).

Figure 7:
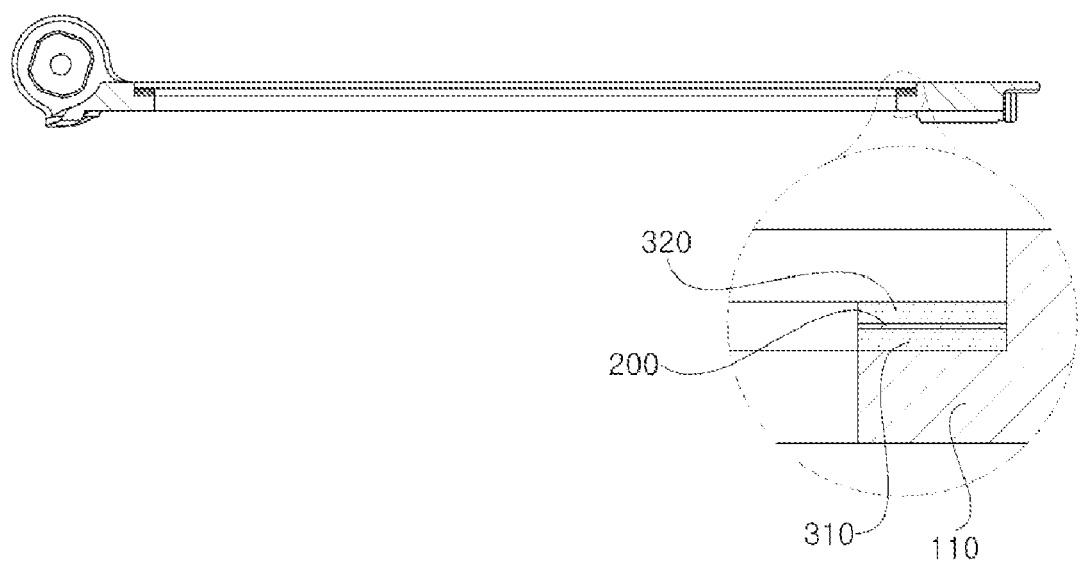

FIG. 6 illustrates the interim-adhesion step (S10), FIG. 7 illustrates the base film release step (S20) and FIG. 8 illustrates the main-adhesion step (S30).

As illustrated in FIG. 6, in the interim-adhesion step (S10), the first melting sheet 310 is adhered to the case 110.

Specifically, the first melting sheet 310 is inserted in the mounting recess 112 together with the heated sheet 200, the second melting sheet 320 and the base film 400, and the first melting sheet 310 is disposed to face one face of the case 110.

After that, the base film 400 is compressed and heated toward the case 110 with a heated mold 60.

Of course, a jig or the like is disposed below the case 110 so that the case is not bent.

The mold 60 has a rectangular shape, of which width is smaller than or equal to the width of the mounting recess 112 and greater than or equal to the width of the first melting sheet 310.

This mold 60 is heated to about 60° C., which is lower than the melting points of the base film 400, the first melting sheet 310 and the second melting sheet 320.

Also, the melting point of the base film 400 is higher than those of the first melting sheet 310 and the second melting sheet 320.

That is, the temperature of the mold 60 is lower than the melting points of the base film 400 and the first melting sheet 310, but is close to the melting point of the first melting sheet 310 rather than the melting point of the base film 400.

Therefore, when compressing and heating the base film 400 with the mold 60, the base film 400 is not melted but the first melting sheet 310 is slightly melted by the heat of the mold transferred through the base film 400 and coupled with the case 110.

Of course, the adhesive strength of the first melting sheet 310 with the case 110 is not large since it has not been completely melted.

As the base film 400 has a melting point higher than the melting point of the first melting sheet 310 and the temperature of the mold 60 is set to be lower than the melting points of the base film 400 and the first melting sheet 310 in the interim-adhesion step (S10) as described above, the temperature of the mold 60 is closer to the melting point of the first melting sheet 310 than to the melting point of the base film 400 to thereby minimize deformation of the base film 400.

In the base film release step (S20) after the interim-adhesion step (S10) is ended, the base film 400 is removed from the second melting sheet 320 as illustrated in FIG. 7.

The base film 400 is easily detached since it is attached to the melting sheet so as to be detached well from the melting sheet.

As the base film 400 is mounted removably on the second melting sheet 320 as described above, the base film 400 can be easily removed upon the assembly and this improves the productivity.

After that, in the main-adhesion step (S30) as illustrated in FIG. 8, the LCD cover 120 is adhered to one face of the second melting sheet 320 from which the base film 400 is removed.

Specifically, the LCD cover 120 is inserted in the mounting recess 112 so that it is in contact with the second melting sheet 320, and the LCD cover 120 is pushed toward the case 110 by a press.

Of course, a jig or the like is disposed below the case 110 so that the case is not bent.

Also, the press 90 is not heated unlike the mold 60 but remains at room temperature.

Further, a coil 70 through which current flows is disposed outside the heated sheet 200.

The coil 70 has thick diameter and is formed in a rectangular shape around the heated sheet 200.

This coil 70 is connected with a high frequency induction heater 80, and the high frequency induction heater 80 applies an alternate current in a high frequency range to the coil 70.

An output power of the high frequency induction heater 80 is 10 to 15 kw, and applies current to the coil 70 for 3 to 15 seconds.

When an alternate current is applied to the coil 70, a magnetic field is formed in an internal space surrounded by the coil 70 and current flows through the heated sheet 200 by the principle of electromagnetic induction.

That is, alternate magnetic flux is generated while the alternate current flows through the coil 70, and to thereby make an induced current flowing through the heated sheet 200.

As the induced current flows through the heated sheet 200, Joule's heat is generated by an eddy current loss.

At this time, the heated sheet 200 is heated to 120 to 150° C.

As the coil 70 is disposed outside the heated sheet 200 and a high frequency alternate current is applied to the coil 770 in the main-adhesion step (S30) as described above, current flows in the inside of the heated sheet 200 by the principle of electromagnetic induction and the heated sheet 200 is heated itself without direct power apply thereto.

Then, by this heat, the first melting sheet 210 and the second melting sheet 320 are melted, and they are hardened to thereby couple the case 110 and the LCD cover 120 with each other when a predetermined time is elapsed with the LCD cover 120 being pressed on the case 110 after the removal of the coil 70.

That is, the first melting sheet 310 is melted to couple the heated sheet 200 and the case 110, and the second melting sheet 320 is melted to couple the heated sheet 200 and the LCD cover 120.

At this time, the heated temperature of the heated sheet 200 is lower than the melting points of the case 110 and the LCD cover 120 and higher than the melting points of the first melting sheet 310 and the second melting sheet 320.

As the heated temperature of the heated sheet 200 is lower than the melting points of the case 110 and the LCD cover 120 and higher than the melting points of the first melting sheet 310 and the second melting sheet 320 as described above, it is possible to minimize deformation of the case 110 and the LCD cover 120 upon the heating of the heated sheet 200.

It is possible to adhere adherends made of synthetic resin having a low thermal conductivity such as polycarbonate, acryl and ABS as the heated sheet 200, which is heated by a high frequency induction, is disposed between the first melting sheet 310 and the second melting sheet 320 to couple the case 100 and the LCD cover 120, give an adhesive strength stronger than a general bonds as the adhesion is carried out by heat, and improve productivity as the adhesion is carried out in a short time.

If necessary, the heated sheet 250 may be formed of a through hole 251 that penetrates therethrough in a direction from the first melting sheet 310 to the second melting sheet 320 and vice versa.

FIG. 9 is structural diagram of a thermal adhesive tape in accordance with another embodiment of the present invention.

As illustrated in FIG. 9, the through hole 251 having a cylindrical shaped is formed in plural in the heated sheet 250.

The through hole 251 makes the first melting sheet 310 and the second melting sheet 320 adhered with each other therethrough upon the manufacture of the thermal adhesive tape or in the main-adhesion step (S30).

The first melting sheet 310 and the second melting sheet 320 are made of a polyester composition, and it is possible to show stronger adhesive strength when the first melting sheet 310 and the second melting sheet 320 are adhered with each other rather than when they are adhered to the heated sheet 250 made of aluminum or copper.

As the through hole 251 is formed in the heated sheet 250 as described above, the first melting sheet 310 and the second melting sheet 320 are coupled directly to each other and this improves the adhesive strength between the adherends coupled by the first melting sheet 310 and the second melting sheet 320.

While the present invention has been described with respect to the specific embodiments, it will be apparent to those skilled in the art that various changes and modifications may be made without departing from the spirit and scope of the invention as defined in the following claims.

What is claimed is:

1. A case module for a portable terminal using a thermal adhesive tape, comprising: a case and a LCD cover of a portable terminal disposed so as to face with each other; a heated sheet made of a conductor and disposed between the case and the LCD cover; a first melting sheet adhered to a face of the heated sheet facing to the case; the first melting sheet adhered directly to the case; and a second melting sheet adhered to the other face of the heated sheet facing to the LCD cover, the second melting sheet adhered directly to the LCD cover; wherein the first sheet is melted to couple the heated sheet and the case to each other and the second sheet is melted to couple the heated sheet and the LCD cover to each other when the heated sheet is heated by a high frequency induction.

2. The case module of claim 1, wherein the case is openly formed of a screen part, and the LCD cover has a width greater than a width of the screen part, and the heated sheet, the first melting sheet and the second melting sheet are formed in a hollowed shape, and have an inner width greater than the width of the screen part and an outer width smaller than a width of the LCD cover.

3. The case module of claim 1, wherein the case is formed of a mounting recess in which the first melting sheet, the heated sheet and the second melting sheet are inserted, and sum of thicknesses of the first melting sheet, the heated sheet and the second melting sheet is smaller than a depth of the mounting recess.

4. The case module of claim 1, wherein the heated sheet is formed with a through hole that penetrates therethrough in a direction from the first melting sheet to the second melting sheet and vice versa.

5. The case module of claim 1, wherein the heated sheet has a thickness smaller than those of the first and second melting sheets.

* * * * *